United States Patent [19]

Lange

[11] Patent Number: 5,090,721
[45] Date of Patent: Feb. 25, 1992

[54] PROCESS FOR MANUFACTURING A SCREEN BASKET AND SCREEN BASKET MADE BY THIS PROCESS

[75] Inventor: Werner Lange, Nattheim, Fed. Rep. of Germany

[73] Assignee: J. M. Voith GmbH, Heidenheim, Fed. Rep. of Germany

[21] Appl. No.: 607,600

[22] Filed: Oct. 31, 1990

Related U.S. Application Data

[63] Continuation of Ser. No. 570,392, Aug. 21, 1990, abandoned.

Foreign Application Priority Data

Aug. 23, 1989 [DE] Fed. Rep. of Germany ....... 3927748

[51] Int. Cl.⁵ .............................................. B23K 31/02
[52] U.S. Cl. .................................. 220/485; 29/163.6; 228/182; 209/411
[58] Field of Search ........................ 220/485, 493, 494; 403/400, 396, 384, 340; 29/163.6, 103.7; 278/182; 209/411

[56] References Cited

U.S. PATENT DOCUMENTS

| | | | |
|---|---|---|---|
| 225,919 | 3/1880 | Cobb | 209/411 |
| 1,636,592 | 7/1927 | Cushwa | 29/163.6 |
| 3,469,300 | 9/1969 | Nagin | 29/163.6 |
| 3,979,856 | 9/1976 | Belcher | 220/485 |
| 4,250,664 | 2/1981 | Remke | 220/485 |
| 4,372,351 | 2/1983 | Myers | 220/485 |
| 4,526,285 | 7/1985 | Cerveny et al. | 220/485 |

FOREIGN PATENT DOCUMENTS 0182688 10/1985 European Pat. Off. .

*Primary Examiner*—Joseph Man-Fu Moy
*Attorney, Agent, or Firm*—Baker & Daniels

[57] ABSTRACT

This invention concerns a process for making rotationally symmetric screen baskets featuring axially parallel bars with screen slots contained in between and, for support of the bars, rings that are coaxial with the basket axis, the rings being provided with recesses that are open toward the rim and the bar feet being placed and fastened in the recesses.

The invention is characterized by the following features:

(a) the bars are placed in the recesses while the rings do not have their final rounded shape yet;
(b) next, the rings are rounded so as to close the circular shape and to clamp the bars in place in the recesses that are being constricted by the rounding.

15 Claims, 2 Drawing Sheets

PROCESS FOR MANUFACTURING A SCREEN BASKET AND SCREEN BASKET MADE BY THIS PROCESS

This is a continuation of application Ser. No. 07/570,392, filed Aug. 21, 1990, now abandoned.

BACKGROUND OF THE INVENTION

The invention concerns a process for the manufacture of rotationally symmetric screen baskets featuring axially parallel bars with screen slots contained in between, and featuring rings that are coaxial to the basket axis for support of the bars, where the rings are provided with recesses open toward the rim, and the feet of the bars are placed in the recesses and fastened. The invention also concerns a screen basket made according to the process. Such processes and such screen baskets are known from the German patent disclosure 33 27 422.

The attachment of the bars to the rings is very expensive to manufacture. The bars are fastened on the rings by welding. This involves several disadvantages: the welding sets up stresses in the material causing a warping of the entire screen basket; the fastening is not sufficiently safe, since the welding seams may split in the course of time; the fabrication is unwieldy and time-consuming; and, it is relatively difficult to accurately adjust the width of the screen slot between two adjacent bars.

The problem underlying the invention is to provide a process which is not associated with the said disadvantages, and to provide screen baskets whose manufacture is correspondingly more favorable. In detail, this is to be accomplished by avoiding the said welding stresses, in that the fastening is marked by greater safety, in that the screen slots can be adjusted more accurately, and in that the manufacture becomes simpler and more cost-efficient.

SUMMARY OF THE INVENTION

This problem is solved by the features of the present invention. A process for the manufacture of a rotationally symmetric screen basket is provided. The screen basket is of the type having axially parallel bars with screen slots therebetween. The basket further has an axis and includes rings for support of the bars. The rings are coaxial to the basket axis, have an inner rim, and are provided with recesses which open toward the rim. The bars have feet whereby the feet are positioned and fastened in said recesses. In a preferred embodiment the process comprises: providing recessed bodies to be rounded into rings; placing the bars into the recesses prior to rounding the bodies into rings; and thereafter rounding the bodies into rings so that the rings are closed in a circular shape, and so that the bars are clamped in position in the recesses, the recesses being constricted by the rounding.

The present invention also discloses a screen basket made from the inventive process. In a preferred embodiment, the invention includes a rotationally symmetric screen basket. The basket comprises a plurality of axially parallel bars having screen slots therebetween, each of said bars having a foot. A plurality of rings supporting said bars is provided, wherein the rings are formed from bodies that have been rounded into rings, said rings being coaxial to the axis of the basket. The rings have an inner rim and include recesses which open toward the rim, said recesses having the bar feet positioned and fastened therein. The bars are adapted to be placed in the recesses prior to the rounding of the bodies into rings, so that the bars are clamped into position in the recesses, said recesses being constricted by the rounding of the bodies.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
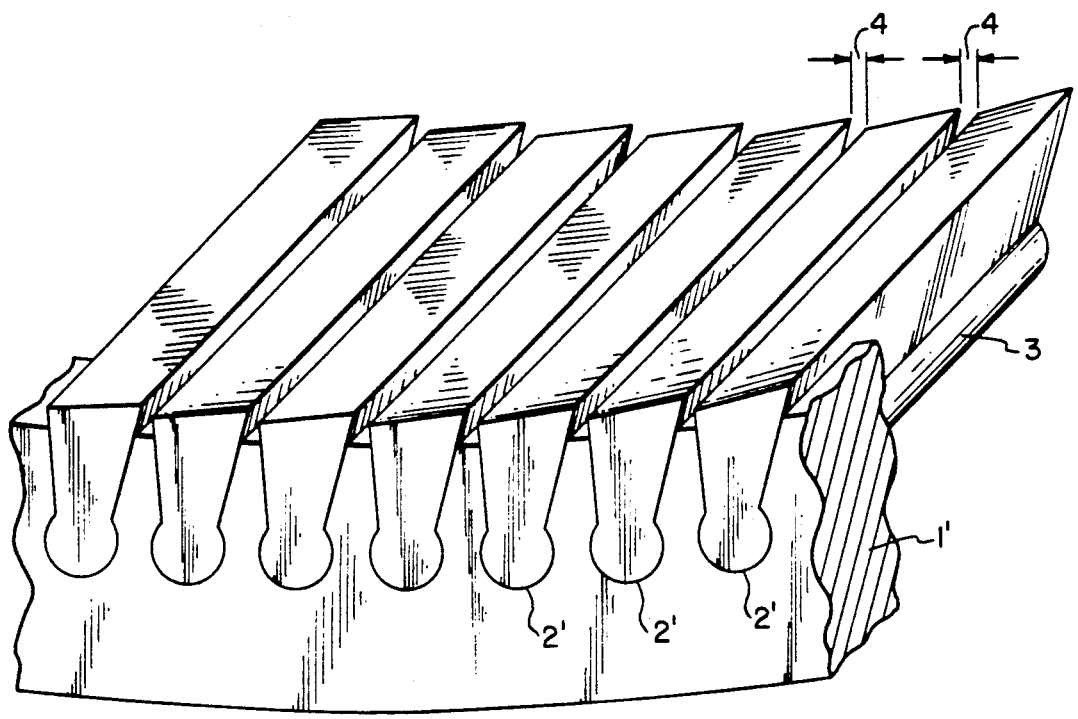
FIG. 1 illustrates a perspective view of a section of a screen basket.

FIG. 1 details a section of a ring 1'. The ring 1' features recesses 2' made by a wire type electrodischarge machining. Also depicted are profile bars 3 which are slipped into the various recesses 2' in such a way that—viewed in plan view—they will extend perpendicularly to the ring section 1' and be situated parallel to one another. This leaves between adjacent bars 3 a space 4 which forms the screen slot.

As can be seen from FIG. 1, the ring section 1 represents part of a continuous ring which on its entire inner circumference features bars 3 of the illustrated type.

Figure 2:
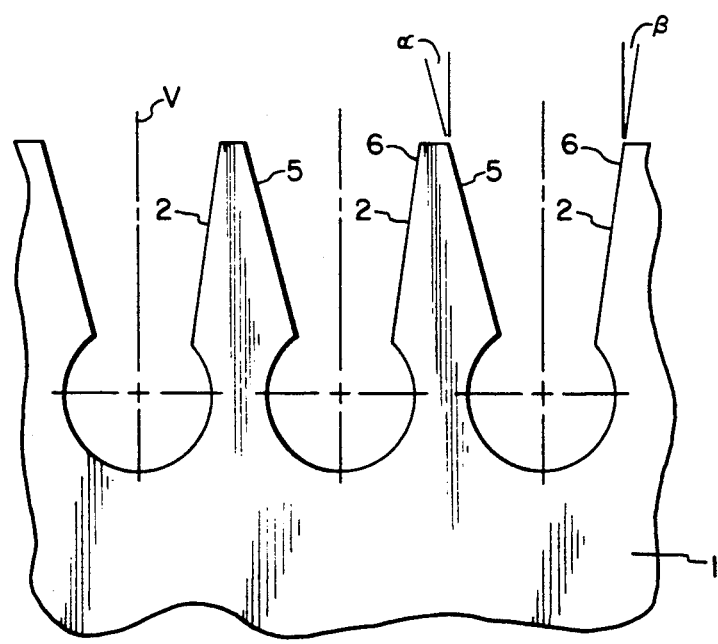
FIG. 2 illustrates a steel rod provided with recesses.

The ring section illustrated in FIG. 2 is shown in an early stage of its fabrication, namely that of a steel rod 1 that has not yet been rounded into a ring. However, the recesses 2 have already been completed but not yet slighlty deformed into recesses 2' of ring 1'. The side faces 5 and 6 of the recesses extend at specific angles —here $\alpha$ and $\beta$—to the vertical. For economy of manufacture, several steel rods 1 are placed parallel and in contact with one another prior to electrodischarge machining, so that they will form a packet. Electrodischarge machining can now be performed on the entire packet, i.e., on a number of steel rods, in a single operation.

Figure 3:
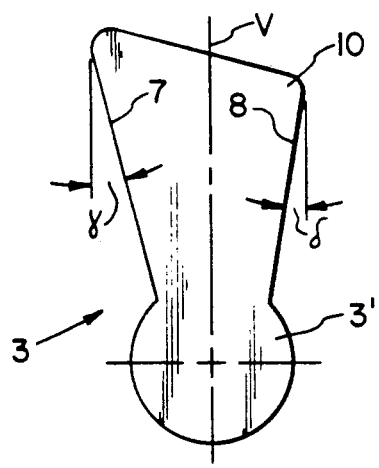
FIG. 3 illustrates a bar for insertion into a recess in the steel rod.
Figure 4:
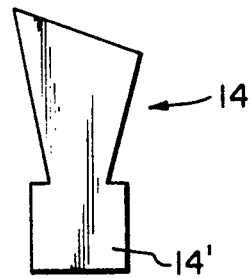
FIGS. 4–8 illustrate alternate configurations of the bar shown in FIG. 3.
Figure 5:
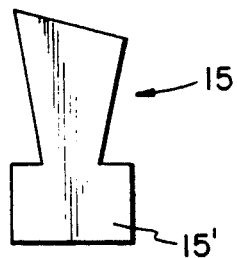
Figure 6:
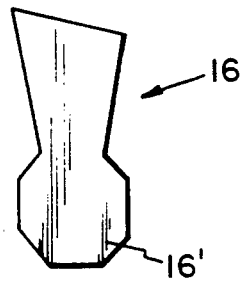
Figure 7:
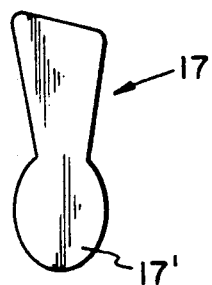
Figure 8:
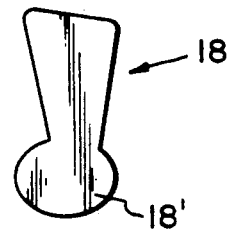

The profile bar 3 illustrated in FIG. 3 is made, e.g., by an extrusion or drawing process. Its design is such that at any rate it can be inserted in the recess 2 in the steel rod 1 without difficulty, as long as the steel rod 1 has not been rounded yet to its final shape. As can be seen, the foot part 3' of the profile bar 3 is circular in cross section. FIGS. 4–8 show alternative configurations of the profile bar in cross section. The utmost part of the head part of profile bar 3, 14–18, that is, the part which protrudes out of the recess in the steel rod 1, sticks in the finished condition of the screen basket radially inward with respect to retaining ring 1', into the screen basket center and is of a design such as will be optimal for the technology of the dewatering or sorting.

Here, too, it is evident again that the side faces 7, 8 of the head part form with the vertical a specific angle of inclination, presently the angles γ and δ. The cross-section of head parts 3, 14–18, respectively, substantially widens in this radially inward direction.

As explained above, the invention is based on the clamping of the profile bars 3 in the recesses 2, as a consequence of rounding the steel rods 1 until reaching a circular shape, so that the steel rods 1 finally will have the shape of continuous rings. In such rounding, the side faces 5, 6 of the electrodischarge machined recesses 2 approach each other, thereby pressing down on the corresponding side faces 7, 8 of the profile bars 3 and clamping them in place. Naturally, attention must be paid to not perform the clamping in excess, with the result of material destruction. Consequently, the said angles, i.e., α and β on the side and γ and δ on the other, must be adapted to one another appropriately. This means that the head part of the individual profile bar 3 that protrudes out of the recess 2 must in its condition of insertion in the recess 2 be somewhat slimmer than the funnel-shaped recess 2. How great the differences between the said angles will be, however, depends on various other circumstances, among others upon the selection of material. With appropriate materials selected for the profile bars 3 or the steel rods 1, the conditions may be highly variable. In the extreme case, for instance when selecting rubber or rubbery materials for the profile bars 3, it is even conceivable that the angles of the side faces 5 and 6 to the horizontal and the angles of the side faces 7 and 8 to the horizontal will be equally large.

The dimension in cross section of the foot, or root, portion 3', 14', 15'. etc., of the profile bars 3, 14, 15, etc., in the longitudinal direction of the clamping rods deviates only by at most 4/100 mm from the corresponding dimension of the cross section of the grooves of the clamping rods so that a slight gap exists therebetween in the initial state, that is, prior to forming the rod into a ring. The dimension in the transverse direction deviates only by at most 2/100 mm from the corresponding dimension of the cross section of the grooves of the clamping rods so that a slight gap also exists therebetween in the initial state, prior to forming the rod into a ring. The bars are pushed lengthwise into the grooves, with the grooves acting as clamping recesses with respect to the foot portions of the profile bars in the initial state prior to forming the rods into rings.

The maximum dimension of the grooves in the lengthwise direction of the clamping rods is 2/1000th of the inner circumference of the rings. By using appropriate profile bars 3, 14, 15, etc., with corresponding dimensions in cross section a great number of bars can be used for building the screen basket, having an equal number of slots between them. As a result, a great throughflow area is provided as a so-called free screening area or screening space, taking into account that the slots may have a minute width of only 0.2 or 0.3 mm, as is often required.

The dimension of the cross section of the profile bars 3, 14, 15, etc., is, at their radially inner head portions in the longitudinal direction of the clamping rods, relatively smaller than at the radially outer foot (root) portion 3', 14', 15', etc., in order to obtain a greater gap at the radially inner portion than at the radially outer portion in the initial state, prior to forming the rod into a ring. The maximal dimension of the cross section of the foot portion of the bars 3, 14, 15, etc., in the longitudinal direction of the rods is, by at least 1 mm, greater than the dimension of the radially inner area of said cross section in said direction adjacent the foot portion. The cross section of the foot portion may be substantially circular, rectangular, quadratic, elliptical or polygonal.

Generally, the clamping rings are substantially straight rods having the grooves formed therein. The bars are inserted into the grooves so that a screen mat is produced. The ends of the screen mat are then brought together, rounding the screen mat. The ends of the screen mat are then welded to one another. As a result, the rods are formed into a ring, thereby forming a screening basket consisting of screening bars and clamping rings, forming a rigid screen structure. Centering rings may then be shrink-fitted to the end faces of the screen basket.

Alternatively, it is also conceivable that the manufacture of the rings not be based on steel strips, but rather on other bodies that are already prerounded. It is only important that the rings are not yet completely rounded prior to insertion of the bars, that is, that they not yet form continuous rings.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process for the manufacture of a rotationally symmetric screen basket, said screen basket having axially parallel bars with screen slots therebetween, said basket further having an axis and including rings for support of said bars, said rings being coaxial with said axis, said rings having an inner rim and being provided with recesses which open toward said rim, each of said bars having a respective foot portion whereby said foot portions are positioned and fastened in said recesses, said process comprising:
   providing respective bodies to be rounded into said rings, said bodies having said recesses formed therein;
   placing said bars in said recesses prior to rounding said bodies into rings; and
   rounding said bodies into rings so that the circular shape of said rings is closed and so that said bars are clamped in position in said recesses, said recesses being constricted by said rounding.

2. A process as described in claim 1, further comprising:
   providing steel rods to be rounded into said rings;
   bundling said rods so that the rods lie directly side by side;
   producing said recesses in said rods by electrodischarge machining;
   placing said bars in the recesses so that a screen mat is produced, by screen mat having ends;
   bending said screen mat ends so that said ends may be brought together; and
   rounding said screen mat by welding said screen mat ends to one another.

3. A process as described in claim 1, further including the step of:

shrink-fitting centering rings to the end faces of said screen basket.

4. A process as described in claim 2, further including the step of:
shrink-fitting centering rings to the end faces of said screen basket.

5. A process as described in claim 1, in which each of said foot portions has a cross sectional dimension in the longitudinal direction of said bodies, said cross sectional dimension deviating by no more than 0.04 mm from a corresponding cross sectional dimension of said recesses so that a slight gap exists therebetween prior to said rounding of said bodies into rings.

6. A process as described in claim 1, in which each of said foot portions has a cross sectional dimension in the transverse direction of said bodies, said cross sectional dimension deviating by no more than 0.02 mm from a corresponding cross sectional dimension of said recesses so that a slight gap exists therebetween prior to said rounding of said bodies into rings.

7. A process as described in claim 1, wherein the bars are placed in the recesses by pushing said bars lengthwise into said recesses.

8. A process as described in claim 1, wherein the maximum dimension of said recesses in the lengthwise direction of said bodies is 2/1000th of the inner circumference of said rings.

9. A process as described in claim 5, wherein said cross sectional dimension in the longitudinal direction is at least 1 mm greater than the radially inner area of said cross section in the direction adjacent said respective foot portions.

10. A process as described in claim 1, wherein said foot portions have respective cross sections, said cross sections being substantially circular, rectangular, quadratic, elliptical or polygonal.

11. A rotationally symmetric screen basket, said screen basket having an axis, comprising:

plurality of axially parallel bars having screen slots therebetween, each of said bars having a foot portion;
a plurality of rings supporting said bars, said rings being formed from bodies whereby the bodies are rounded into rings, said rings being coaxial to said axis, said rings having an inner rim and being provided with recesses which open toward said rim, said recesses having said bar foot portions positioned and fastened therein;
said bars being adapted to be placed in said recesses prior to said bodies being rounded into rings so that said bars are clamped in position in said recesses, said recesses being constricted by said rounding.

12. A screen basket as described in claim 11, in which said rings are formed from steel rods, said steel rods having said recesses formed therein by electrodischarge machining.

13. A screen basket as described in claim 11, in which said recesses have respective side faces and said bars have a longitudinal axis, wherein said recess side faces extend parallel to said longitudinal axis, said bars further including corresponding side faces positioned so that said bar side faces face toward said recess side faces.

14. A screen basket as described in claim 13, wherein an area defined by a cross section of said bar between said bar side faces is less than an area of said recess defined by said recess side faces so that clamping forces occurring during said rounding are reduced.

15. A process as described in claim 1, in which each of said bars includes a respective head portion opposing said foot portion, wherein the respective head portions project radially inwardly of said rings when said respective bodies have been rounded into rings, said respective head portions having an increasingly widening cross sectional dimension in said radially inward direction with respect to said ring, wherein the maximum width of said cross sectional dimension of the head portion, measured in the longitudinal direction of said bodies prior to said rounding, is at least one mm less than the corresponding maximum cross sectional dimension of the foot portion.

* * * * *

UNITED STATES PATENT AND TRADEMARK OFFICE
CERTIFICATE OF CORRECTION

PATENT NO. : 5,090,721
DATED : February 25, 1992
INVENTOR(S) : Werner Lange It is certified that error appears in the above-identified patent and that said Letters Patent is hereby corrected as shown below:

Claim 2, Column 4, Line 62, delete "by" and substitute therefor --said--.

Claim 11, Column 6, Line 1, before "plurality" insert --a--.

Signed and Sealed this

Eighth Day of June, 1993

Attest:

MICHAEL K. KIRK

*Attesting Officer*     *Acting Commissioner of Patents and Trademarks*